United States Patent
Khanduri et al.

(10) Patent No.: US 10,382,092 B2
(45) Date of Patent: Aug. 13, 2019

(54) METHOD AND SYSTEM FOR FULL DUPLEX ENHANCED AUDIO

(71) Applicant: Verizon Patent and Licensing Inc., Arlington, VA (US)

(72) Inventors: Prakash Khanduri, Freehold, NJ (US); Anwarul Hannan, Bridgewater, NJ (US); David Bien, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/822,570

(22) Filed: Nov. 27, 2017

(65) Prior Publication Data

US 2019/0165832 A1 May 30, 2019

(51) Int. Cl.
*H04L 5/14* (2006.01)
*H04B 3/23* (2006.01)

(52) U.S. Cl.
CPC .............. *H04B 3/237* (2013.01); *H04L 5/14* (2013.01)

(58) Field of Classification Search
None
See application file for complete search history.

(56) References Cited

U.S. PATENT DOCUMENTS

| 8,964,998 | B1 * | 2/2015 | McClain | H03G 3/32 381/106 |
| 9,659,576 | B1 * | 5/2017 | Kotvis | G10L 21/0224 |
| 2007/0091873 | A1 * | 4/2007 | LeBlanc | H04B 3/23 370/352 |
| 2007/0286404 | A1 * | 12/2007 | Popovic | H04B 3/237 379/406.01 |
| 2008/0025538 | A1 * | 1/2008 | Zad-Issa | H04R 25/43 381/315 |
| 2008/0205633 | A1 * | 8/2008 | Dyba | H04B 3/237 379/406.08 |
| 2011/0311066 | A1 * | 12/2011 | Nagy | H04B 3/23 381/66 |
| 2013/0251167 | A1 * | 9/2013 | Gautama | H04R 3/007 381/66 |
| 2015/0112672 | A1 * | 4/2015 | Giacobello | H04M 9/082 704/233 |
| 2016/0006880 | A1 * | 1/2016 | Lu | H04M 9/082 379/406.08 |
| 2017/0178663 | A1 * | 6/2017 | Misawa | H04R 3/02 |

* cited by examiner

*Primary Examiner* — Kodzovi Acolatse

(57) ABSTRACT

A method, a device, and a non-transitory storage medium are described in which a full duplex system may use information from a user of the device as a basis to configure parameters of a dynamic range controller system. The parameters may include high pass filter values, compression values, and masking values. The full duplex system may use a pre-distortion filter for generating an estimated echo feedback reference signal. For generating the estimated echo feedback reference signal, the pre-distortion filter uses an echo coupled reference signal via microphone path as a reference signal, and an echo feedback reference signal via speaker feedback path as the input. An echo canceller of the full duplex system may use the estimated echo feedback reference signal, which takes echo path distortion into consideration, for cancelling both linear and non-linear echo.

20 Claims, 20 Drawing Sheets

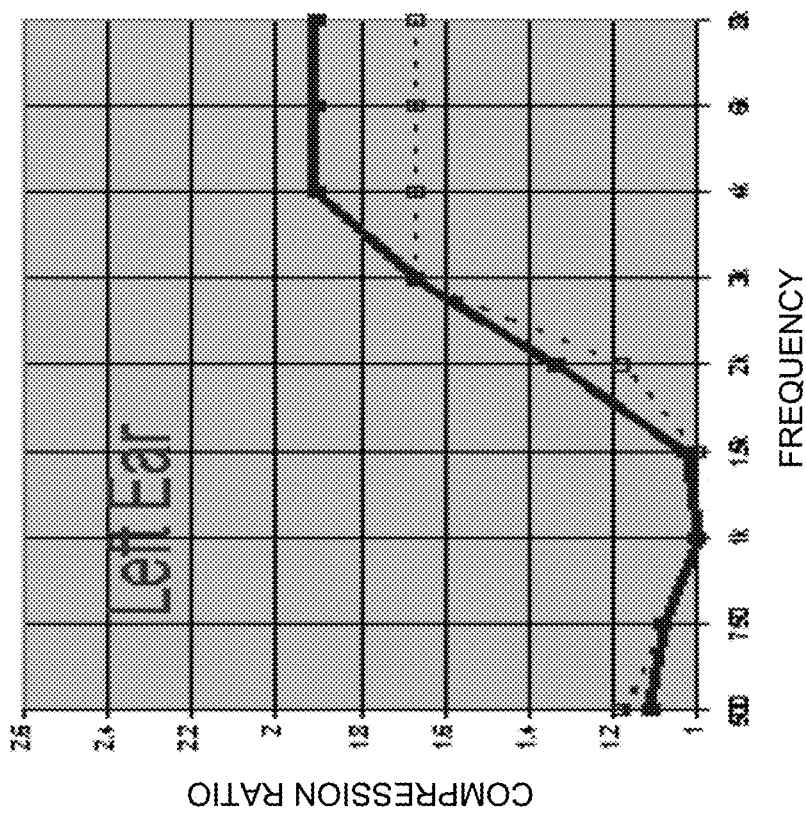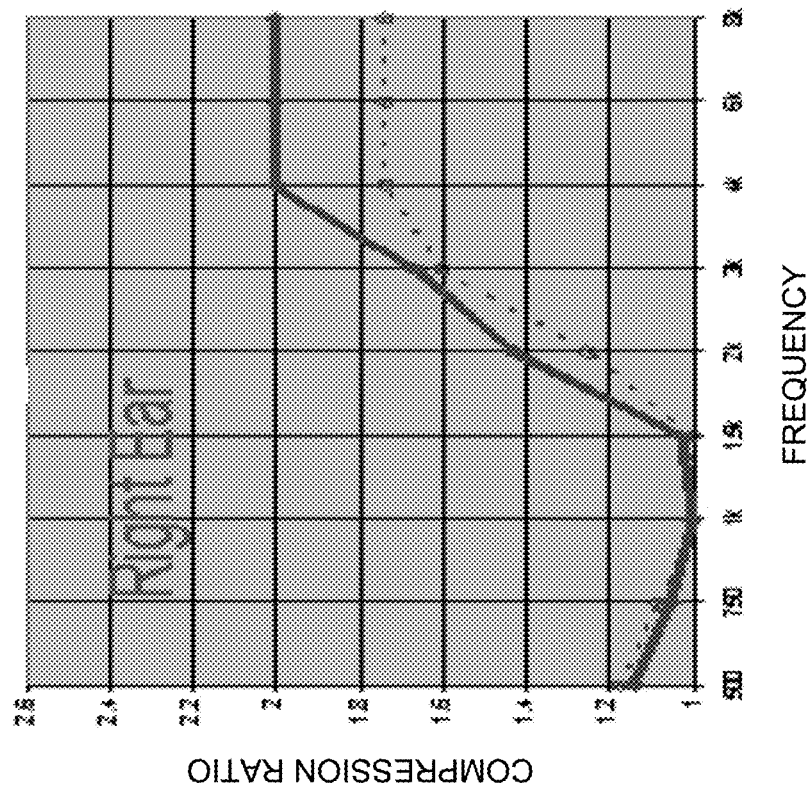
Fig. 3C

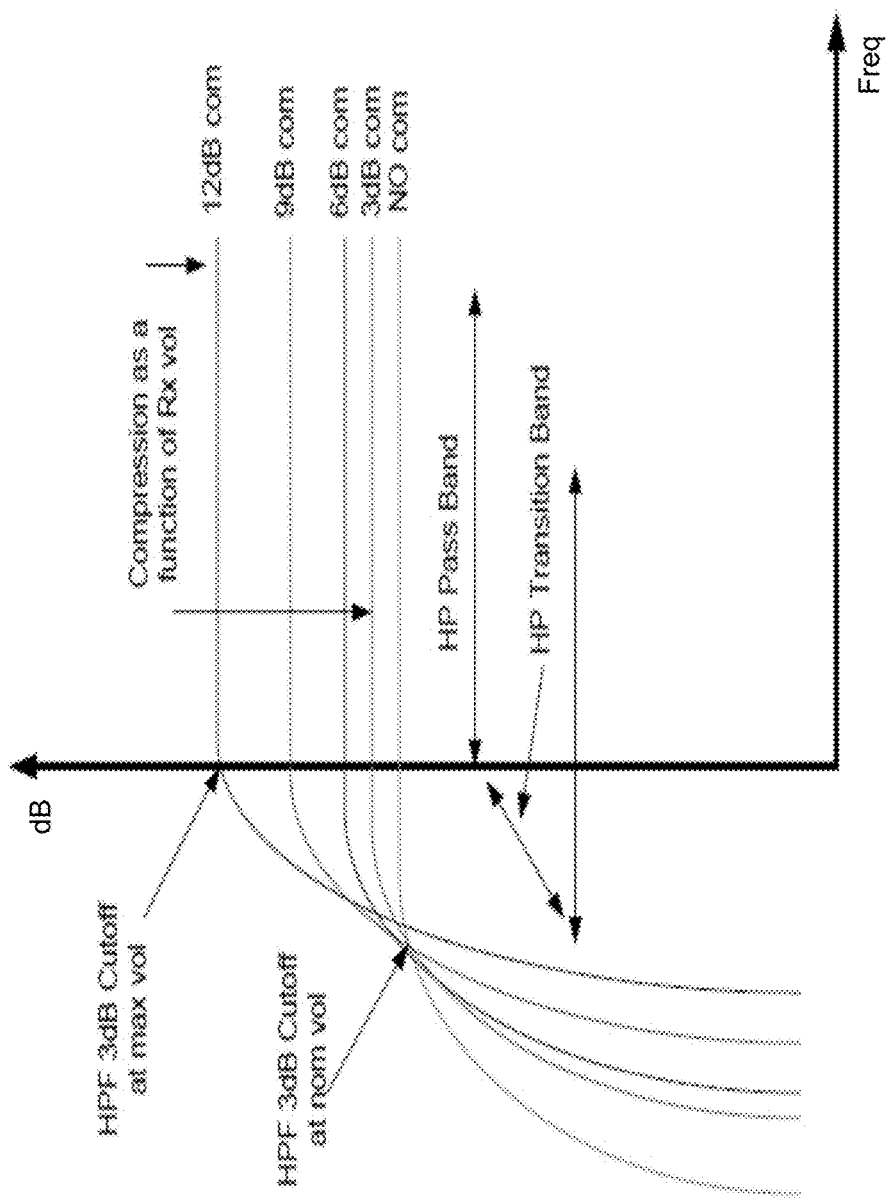

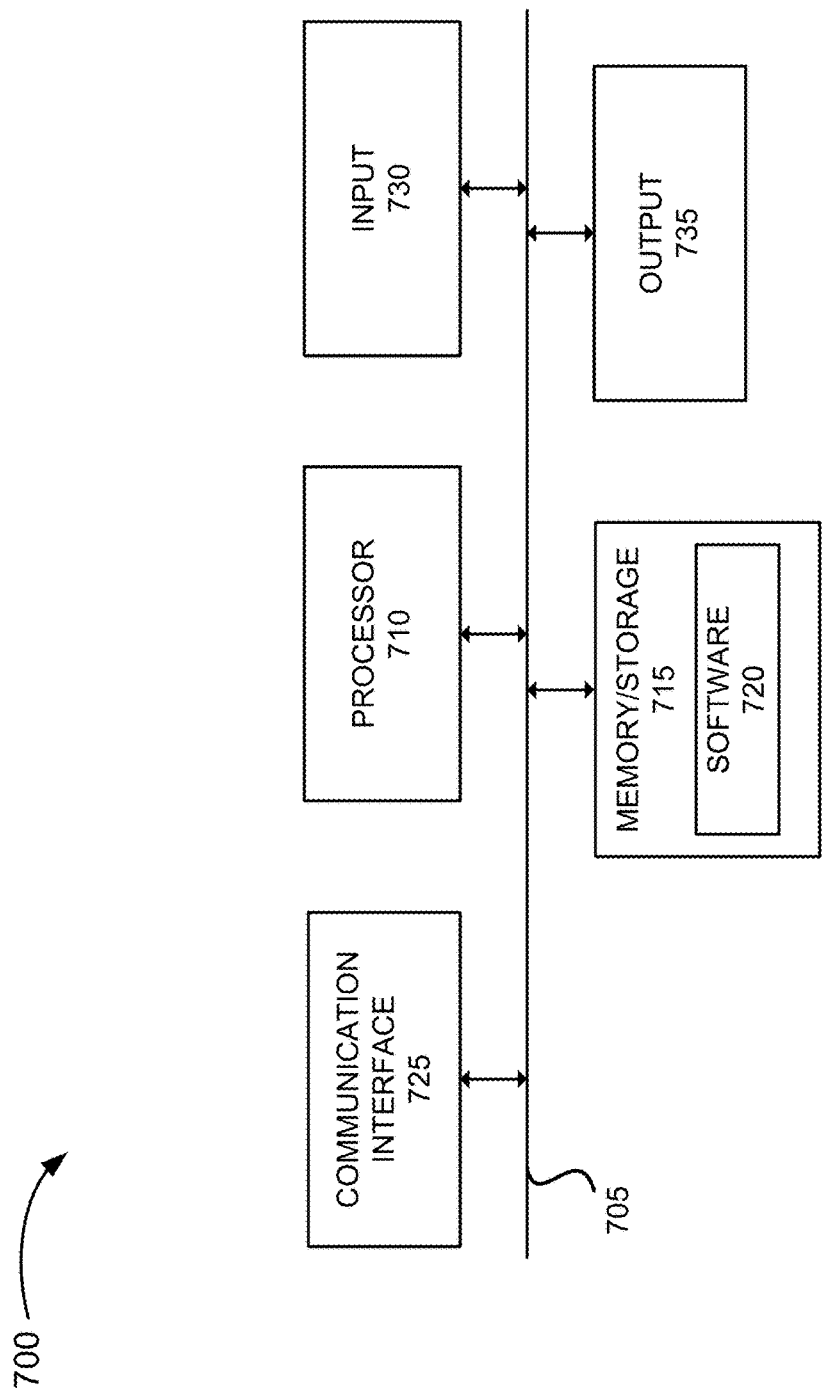

METHOD AND SYSTEM FOR FULL DUPLEX ENHANCED AUDIO

BACKGROUND

Ubiquitous communication and information exchange offer users numerous advantages. There are a variety of devices available to users, such as smartphones, tablets, netbooks, phablets, wearable devices, and so forth. These types of devices, as well as other types, provide users with various services and applications, such as media services, communication services, navigation services, web browsing, business-related services, and so forth.

BRIEF DESCRIPTION OF THE DRAWINGS

FIG. 3C is a diagram illustrating exemplary compression curve including frequencies and gains that may be generated based on the audiogram of the user;

FIG. 4A is a diagram illustrating an exemplary process of a cutoff frequency shifting function of a dynamic high pass filter based on a volume setting;

FIG. 7 is a diagram illustrating exemplary components of a device that may correspond to a wearable device illustrated and described herein.

DETAILED DESCRIPTION OF PREFERRED EMBODIMENTS

Figure 1:
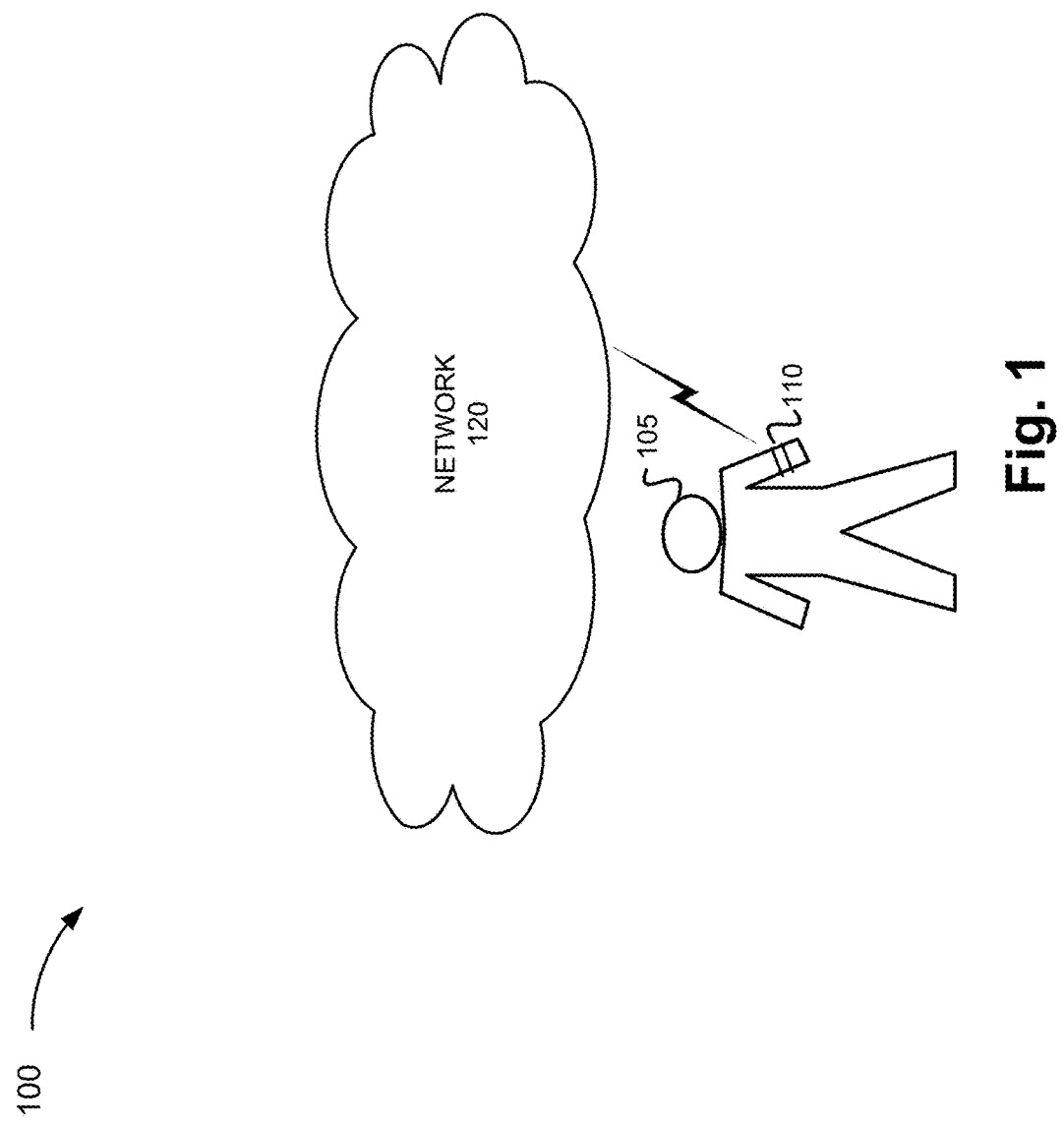
FIG. 1 is a diagram illustrating an exemplary environment in which an exemplary embodiment of a full duplex system may be implemented.

The following detailed description refers to the accompanying drawings. The same reference numbers in different drawings may identify the same or similar elements. Also, the following detailed description does not limit the invention.

The use of wearable devices continues to grow in popularity for various reasons (e.g., services and applications, form factors (e.g., small size, light weight, etc.), fashion, etc.). As an example, watches, glasses, bracelets, and other types of wearable devices have emerged that can provide voice services and other types of services/applications that may be also available on smartphones and/or other types of user devices.

While the utility of wearable devices may compare to other types of user devices, there are technological challenges associated with wearable devices. For example, the size of a wearable device presents challenges to performance in providing full duplex audio communication. For example, a wearable device or other type of small form factor user device includes a small speaker that is not capable of producing low frequencies, which causes distortion and unwanted signals. Additionally, while in speaker mode, which is the default mode of operation for a wearable device, the echo coupling and distortion can negatively impact the performance of the audio chain of the wearable device, and consequently hinder the user's ability to communicate, such as during a telephone call or a video call.

A user device may include an acoustic echo cancellation (AEC) architecture comprising a linear echo canceller and a nonlinear echo canceller. When there is distortion in the echo path between an uplink and a downlink, echo cancellation performance can be poor and can result in poor double talk quality because a non-linear processing (NLP) block, which acts as a suppressor, suppresses the uplink speech in addition to residual echo. Further, because of the small form factor, the echo coupled signal emitted from the speaker, which may be up to approximately 30 dB or more than a voice signal, may be detected by a microphone. As a result, the total signal detected via the microphone may be a stronger signal than a signal detected by the microphone from the user's voice. Based on these circumstances, to prevent or minimize the echo coupled signal causing distortion in the uplink/microphone path, the echo coupled signal would need to be reduced prior to being processed by the AEC. However, by doing so, the signal-to-noise ratio (SNR) of the AEC is reduced by the same amount, and may significantly reduce the dynamic range and operating range of the AEC.

Also, due to the small form factor and speaker size of the wearable device or other types of user devices, an echo reference signal does not account for the echo coupled signal in the uplink/microphone path and the distortion in the echo path. Thus, a linear echo canceller is unable to accurately estimate echo, which results in poor full duplex communication performance.

A further problem with wearable devices is that the audio chain of the device does not account for the differences in hearing abilities among users. Rather, the audio chain of the user device may be configured based on a one-size-fits-all design and setting.

According to exemplary embodiments, a full duplex system of a user device is described that includes enhancing the downlink (DL) audio quality and the uplink (UL) audio quality based on the user device capabilities and the hearing capabilities of a user. According to an exemplary embodiment, the system may use audiogram information of the user of the user device as a basis to configure dynamic range controller (DRC) parameters of a system. According to an exemplary embodiment, the parameters may include high pass filter values, compression values, and masking values for customizing the downlink. According to an exemplary embodiment, the system may use an echo coupled reference signal of an uplink/microphone path and an echo feedback reference signal to generate an estimated echo feedback reference signal. According to an exemplary embodiment, an echo canceller of the full duplex system may use the estimated echo feedback reference signal, which takes echo path distortion into consideration, for cancelling both linear and non-linear echo.

As a result of the foregoing, the full duplex system may improve downlink quality and double talk performance based on the parameter values that are configured in view of the audiogram information that is specific to the user. Additionally, the full duplex system may allow the echo canceller to converge faster than conventional echo cancellation systems because the estimated echo feedback reference signal is generated based on the echo coupled reference signal, and subsequently used by the echo canceller. The echo cancellation system may use linear cancellation for cancelling both linear and non-linear each without complex filtering (e.g., Volterra filtering). In view of the small form factor of wearable devices (or other types of user devices) and cost considerations, the echo cancellation system, as described herein, may improve full duplex voice communication performance and optimize distortion, and eliminate echo at the far end.

FIG. 1 is a diagram illustrating an exemplary environment 100 in which an exemplary embodiment of a full duplex system may be implemented. As illustrated, environment 100 includes a wearable device 110, which may be operated by a user 105. User 105 may communicate with another device via wearable device 110 and a network 120.

Wearable device 110 includes a user device that is worn by user 105. According to exemplary embodiments, wearable device 110 includes the full duplex system, as described herein. According to an exemplary embodiment, wearable device 110 has full duplex communication capability, UL quality enhancements, and DL quality enhancement. According to an exemplary embodiment, wearable device 110 has speaker mode capability. According to an exemplary embodiment, wearable device 110 includes a microphone and a speaker. According to an exemplary embodiment, wearable device 110 supports an audio session (e.g., telephone) and/or an audio and video session (e.g., audio and video conferencing). Wearable device 110 may be implemented as, for example, a head-worn device, an appendage-worn device, a torso-worn device, a neck-worn device, or a device worn on some other part of the user. By way of further example, wearable device 110 may be implemented as a bracelet, an armband, a watch, glasses, a visor, a headset, and so forth. For the sake of illustration, wearable device 110 is illustrated in FIG. 1 as a wrist-worn device.

According to other exemplary embodiments, the full duplex system, as described herein, may be implemented by another type of user device that has full duplex communication capability. For example, the user device may be implemented as a smartphone, a tablet, a netbook, a computer, or other type of end user device.

Network 120 may include one or multiple networks of one or multiple types and technologies. For example, network 120 may include a radio access network (RAN), a core network, a wired network, an optical network, a WiFi network, a Worldwide Interoperability for Microwave Access (WiMAX) network, a local area network (LAN), a personal area network (PAN), the Internet, the World Wide Web, an Internet Protocol Multimedia Subsystem (IMS) network, a Rich Communication Service (RCS) network, a cloud network, a packet-switched network, a private network, a public network, a telecommunication network, an Internet Protocol (IP) network, or some combination thereof.

Figure 2:
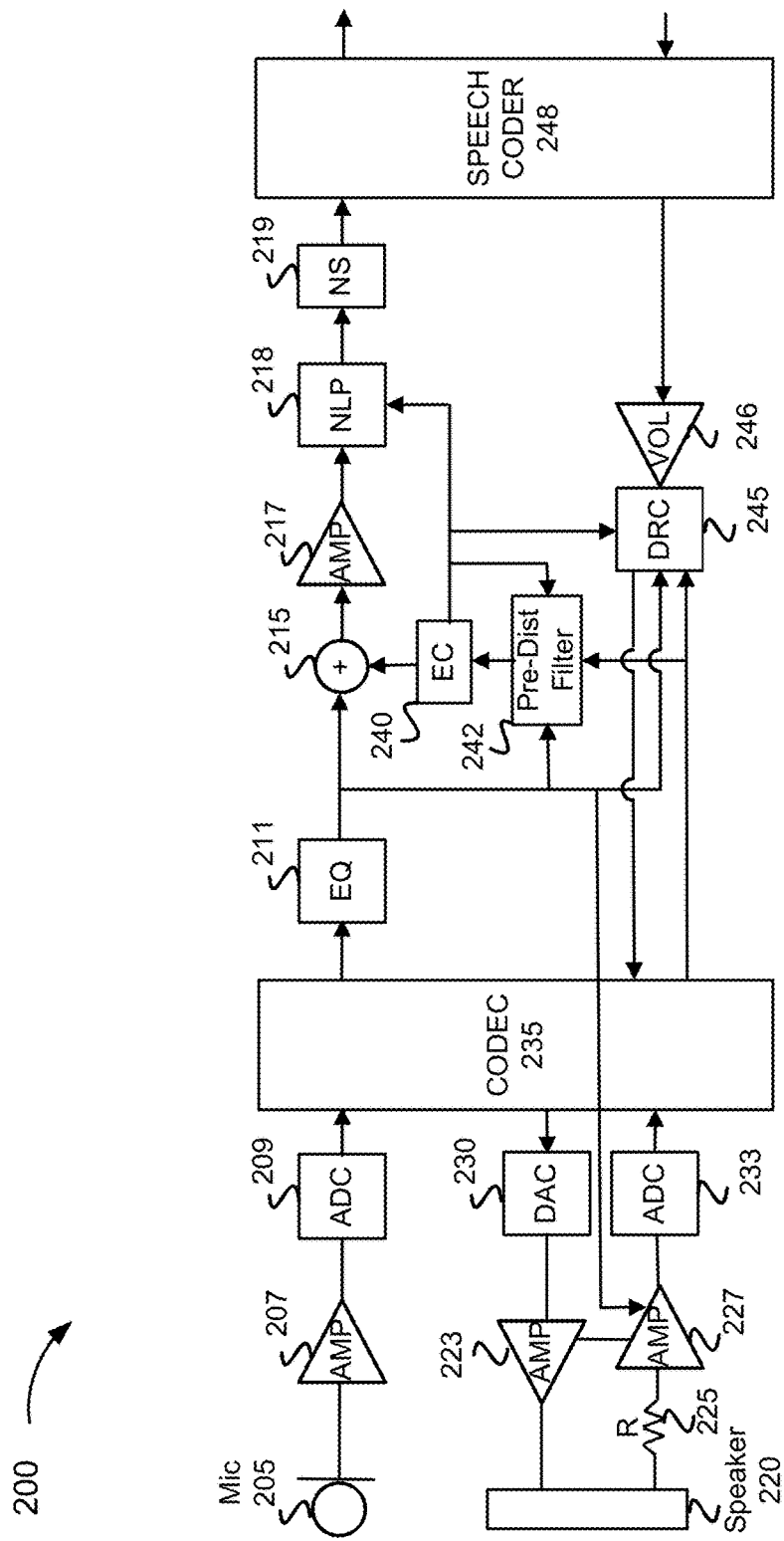
FIG. 2 is a diagram illustrating an exemplary embodiment of a full duplex system included in a wearable device.

FIG. 2 is a diagram of exemplary components of wearable device 110 that may be included in an exemplary embodiment of full duplex system 200. According to other exemplary embodiments, full duplex system 200 may include additional, fewer, and/or different components than those illustrated and described herein. Additionally, according to other exemplary embodiments, full duplex system 200 may include a different arrangement of components than those illustrated and described herein.

As illustrated, full duplex system 200 includes a microphone 205, an amplifier 207, an analog-to-digital converter (ADC) 209, an equalizer 211, a summer 215, an amplifier 217, a non-linear processor (NLP) 218, a noise suppressor (NS) 219, a speaker 220, an amplifier 223, a resistor 225, an amplifier 227, a digital-to-analog converter (DAC) 230, an ADC 233, a codec 235, an echo canceller (EC) 240, a pre-distortion filter 242, a dynamic range controller (DRC) 245, a volume mechanism 246, and a speech coder 248.

Microphone 205 includes a component that converts sound into an electrical signal. Microphone 205 may include various characteristics (e.g., polar pattern, frequency response, transducer type, etc.) that may be conducive for detecting human voice/speech and/or other audio sources. Amplifier 207 may be implemented as a programmable gain amplifier (PGA) or other suitable amplifier. ADC 209 includes logic that converts an analog signal to a digital signal. Equalizer 211 includes a component that strengthens and/or weakens the energy of one or multiple frequency bands or ranges of a signal. Summer 215 includes a component that combines signals.

Amplifier 217 may be implemented as a digital gain stage that is controlled via amplifier 207 (loss applied) and amplifier 227 (gain applied). NLP 218 includes logic that suppresses residual echo in a signal. While in conventional design, an NLP can affect the duplex performance due to the EC block not cancelling the non-linear echo. According to an exemplary embodiment, the EC block will cancel most of the echo and hence the reliance on NLP 218 may be minimized, significantly minimized, or eliminated. Noise suppressor 219 includes logic that eliminates or reduces unwanted noise and/or other undesirable electrical disturbances.

Speaker 220 includes a component that converts an electrical signal into sound. Speaker 220 may include various characteristics (e.g., frequency response, sensitivity, maximum acoustic output, etc.). Speaker 220 may be implemented as a small loudspeaker. Amplifier 223 may be any suitable amplifier such as a class D amplifier. Resistor 225 may be implemented as a static resistor or a variable resistor for current limiting. Amplifier 227 may be implemented as a PGA or other suitable amplifier. Amplifier 227 may equalize the echo coupled signal. ADC 233 includes logic that converts an analog signal to a digital signal. Codec 235 includes logic that encodes and decodes signals.

Echo canceller 240 includes logic that performs echo cancellation. According to an exemplary embodiment, echo canceller 240 performs echo cancellation based on an estimated echo feedback reference signal received from pre-distortion filter 242 and the echo coupled signal. Echo canceller 240 is described further below.

Pre-distortion filter 242 includes logic that generates an estimated echo feedback reference signal based on an echo coupled reference signal (ECRS), an echo feedback reference signal (EFRS), and an echo return loss enhancement (ERLE) signal. Pre-distortion filter 242 may be modeled based on the ECRS as the reference, the EFRS as input, and the adaption speed based on the steady state ERLE. The echo coupled reference signal may include the distortion caused by the acoustics (e.g., between speaker 220 and microphone 205). The echo feedback reference signal may include the downlink signal and distortion introduced by the speaker model of speaker 220. The ERLE signal indicates how well echo canceller 240 is performing and is output by echo canceller 240. For example, the ERLE signal may indicate the amount of echo attenuation relative to critical bands, as described herein. Pre-distortion filter 242 is described further below.

DRC 245 includes logic that estimates compression for each band of a signal. According to an exemplary embodiment, DRC 245 receives and uses an echo coupled signal, the echo feedback reference signal, the ERLE signal, and a speech decoder output signal (SDOS) to estimate the compression. The speech decoder output signal may be a clean reference signal that is output from speech coder 248. DRC 245 also includes logic of a dynamic high pass filter (HPF), as described herein. According to an exemplary embodiment, the dynamic high pass filter includes logic that adjusts a 3 dB cutoff frequency based on a volume setting of wearable device 110. The dynamic high pass filter may use HPF coefficients based on the volume setting and the received frequency response (RFR) of speaker 220. DRC 245 is described further below. Volume mechanism 246 may permit the user to adjust a volume level for the downlink path. Speech coder 248 may include logic of a speech encoding/decoding algorithm. Speech coder 248 may be implemented as a waveform coder, a sub-band coder, or other suitable coder.

Currently, wearable devices do not account for the differences in hearing abilities among users. Rather, the audio chain of current wearable devices may be configured based on a one-fits-all design and setting. Unfortunately, an individual user's ability to perceive sound varies from person-to-person based on various factors, such as for example age, genetics, exposure to noise, and so forth. Thus, a wearable device that includes an audio chain configured to account for a user's hearing ability may improve audio performance.

According to an embodiment, the full duplex system of wearable device 110 uses audiogram information or other form of auditory information that indicates the hearing ability of the user (e.g., user 105) (simply referred to as "audiogram information"). According to an exemplary embodiment, the audiogram information pertains to both the left ear and the right ear of the user. A hearing test may, for example, identify a person's threshold level of hearing pertaining to various frequencies and decibel levels. According to another example, the hearing test may identify a person's perceived loudness of various frequencies and decibel levels. An equal-loudness contour is a measure of sound pressure (decibel sound pressure level (dB SPL)) over a frequency spectrum within which a listener perceives a constant loudness when presented with pure steady tones. The loudness contour for a person may vary between individuals. According to various exemplary embodiments, the audiogram information of a user (e.g., user 105), as described herein, may include data pertaining to threshold hearing and/or perceived loudness.

According to various exemplary embodiments, the selection of frequencies used during the hearing test may vary. According to an exemplary embodiment, in view of the frequencies associated with human speech, the selection of frequencies may be fewer than the complete range of frequencies (e.g., 20 Hz-20 kHz) that humans may optimally perceive. According to other exemplary embodiments, the selection of frequencies may include the complete range of frequencies.

A human's auditory system (e.g., the ear) behaves analogous to a frequency analytic device that may be approximated by a bandpass filter bank including overlapping critical bandpass filters. The filter bandwidth (also known as the critical bandwidth) is fairly constant for low center frequencies, while for high frequencies the critical bandwidth increases with the center frequency. The critical bandwidth may be defined as a band of audio frequencies at which subjective response changes abruptly. There are a total of 24 such bands. However, from a human speech standpoint, fewer critical bands may be considered. For example, critical bands 1-21 may be considered for a wideband approach, or critical bands 2-17 may be considered for a narrowband approach. Alternatively, another set of critical bands may be considered. For music or other auditory sources, all of the critical bands may be considered.

The auditory filter of the human ear, which is a direct measure of the critical band, may be expressed as $$ERB=24.7*[(4.37*f)+1]Hz \quad (1),$$

where equivalent rectangular bandwidth (ERB) is an approximation to the bandwidths of the filters in human hearing based on a modeling of filters as rectangular bandpass filters, and "f" is the center frequency of the filter in kHz. Expression (1) is an approximation that is applicable to moderate sound levels and for values of "f" between 100 Hz and 10 kHz.

Figure 3A:
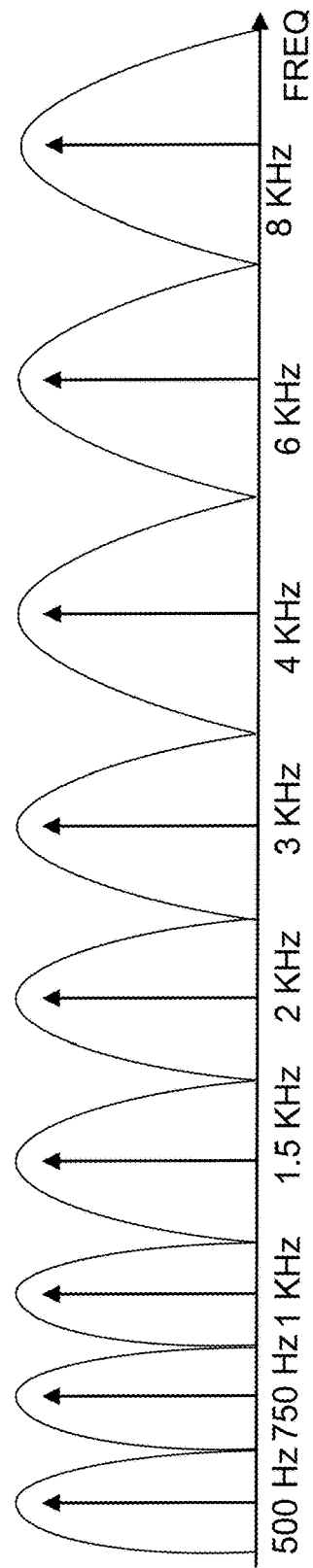
FIG. 3A is a diagram illustrating an exemplary center frequencies and critical bands that a user may be tested.

According to an exemplary embodiment, the hearing test may test the calculated bandwidths based on expression (1) using center frequencies 500 Hz, 750 Hz, 1 kHz, 1.5 kHz, 2 kHz, 3 kHz, 4 kHz, 6 kHz, and 8 kHz, as illustrated in FIG. 3A. According to another exemplary embodiment, the bandwidths and center frequencies may be different. Additionally, the number of center of frequencies may be different.

Figure 3B:
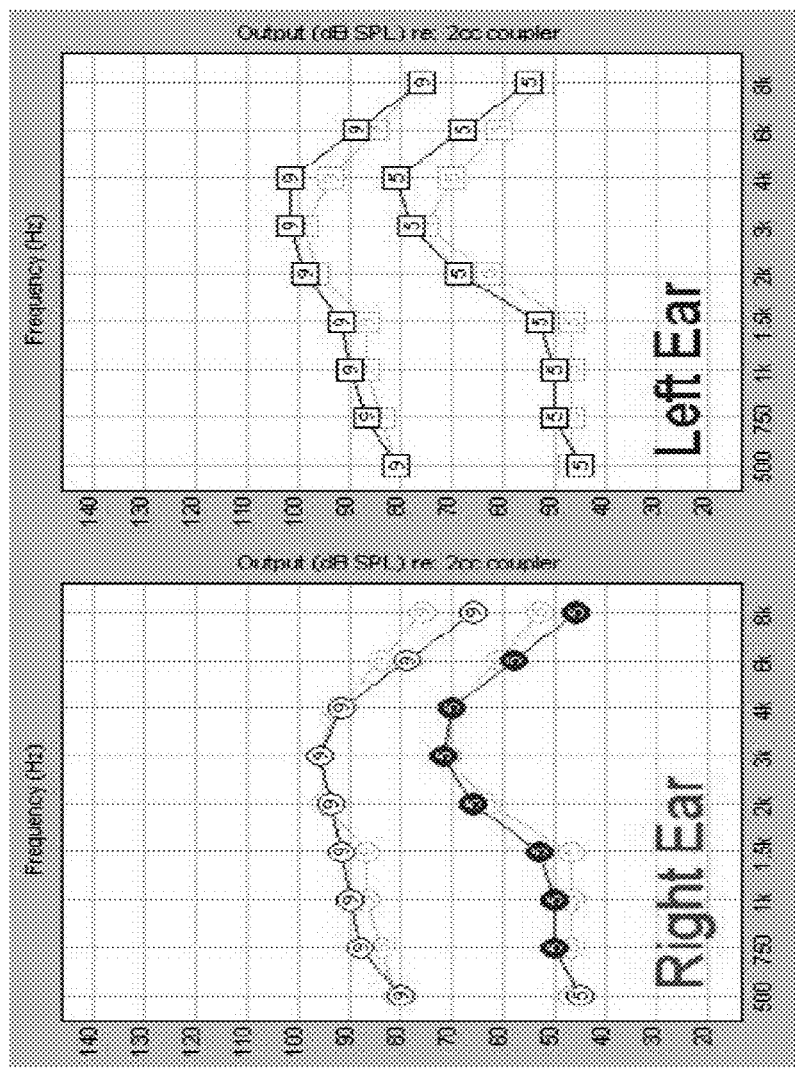
FIG. 3B is a diagram illustrating an exemplary audiogram pertaining to right and left ears of a user.

According to an exemplary embodiment, wearable device 110 may include software (e.g., an application) that generates the audiogram information based on a test given to user 105. According to another exemplary embodiment, the user may import the audiogram information to wearable device 110. FIG. 3B is a diagram illustrating an exemplary audiogram pertaining to right and left ears of a user.

According to an exemplary embodiment, the compression logic of DRC 245 may use the audiogram information to generate a compression curve at the corresponding frequencies and bands. FIG. 3C is a diagram illustrating exemplary compression curve including frequencies and gains that may be generated based on the audiogram information of the user. Additionally, according to an exemplary embodiment, the compression logic of DRC 245 may use the audiogram information to generate masking values so that auditory masking may be provided. According to an exemplary embodiment, DRC 245 includes logic that provides simultaneous masking and/or temporal masking. Simultaneous masking is a frequency domain phenomenon (also known as frequency masking or spectral masking), whereas temporal masking is a time domain phenomenon (also known as non-simultaneous masking). Simultaneous masking occurs when a sound (e.g., a maskee) is made inaudible to a listener by a noise or unwanted sound (e.g., a masker) of the same duration as a sound. On the other hand, temporal masking occurs when a sound makes inaudible other sounds which are presented immediately preceding or following the stimulus. For example, masking that obscures a sound immediately perceiving the masker is called backward masking (or pre-masking), and masking that obscures a sound immediately flowing the masker is called forward masking (or post-masking).

Figure 3D:
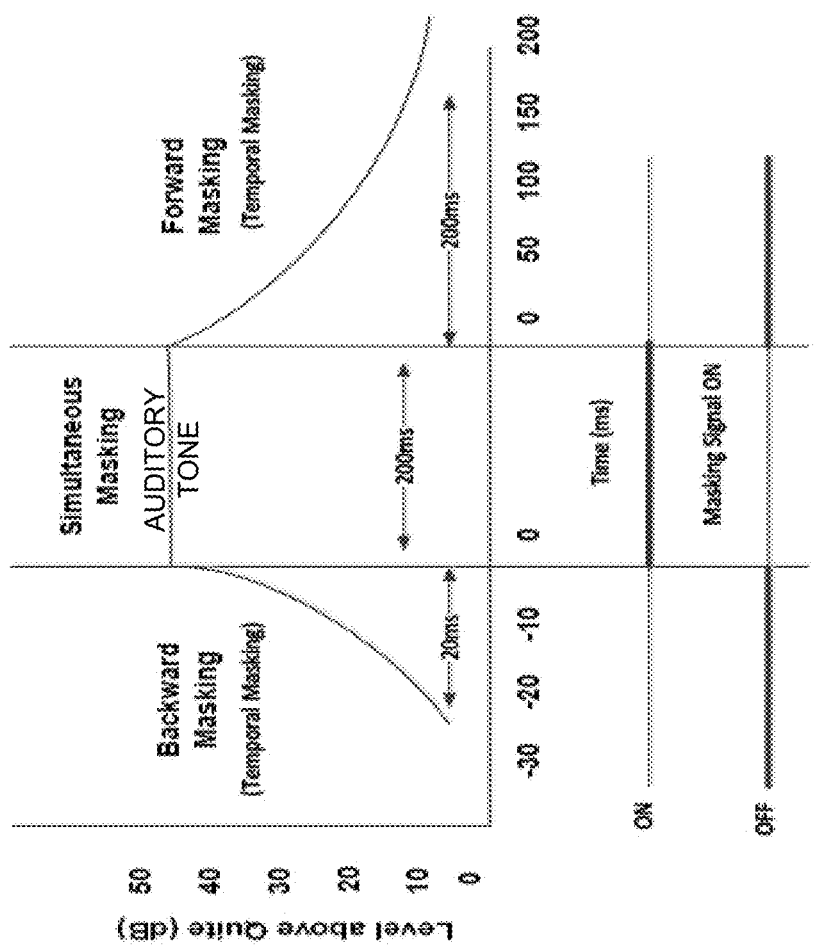
FIG. 3D is a diagram illustrating exemplary processes associated with simultaneous masking and temporal masking.

As mentioned, DRC 245 may generate masking values based on the audiogram information of user 105 and the associated center frequencies and bands, as described herein. For example, referring to FIGS. 3A and 3B, DRC 245 may use the audiogram information and critical bands and center frequency information to generate the masking values for providing simultaneous masking and temporal masking. For example, the masking values may include minimum masking thresholds pertaining to a minimum threshold of hearing, a backing masking, a simultaneous masking, and a forward masking. FIG. 3D is a diagram illustrating an exemplary process of simultaneous masking and temporal masking.

As previously described, DRC 245 may include a dynamic high pass filter and a compressor. According to an exemplary embodiment, the initial 3 dB cutoff of the dynamic high pass filter may be selected based on the received frequency response of speaker 220 at a particular volume setting (e.g., a nominal volume). The 3 dB cutoff may be shifted as a function of received volume. For example, FIG. 4A illustrates an example of how the 3 dB cutoff frequency may change as a function of the volume setting. According to this exemplary representation, the 3 dB cutoff at a nominal volume setting may yield no compression, and the 3 dB cutoff may gradually shift in frequency in correlation to the increase of volume setting up to a maximum volume setting of wearable device 110. The compression values (e.g., 3 dB, 6 dB, etc.) are exemplary values.

Figure 4B:
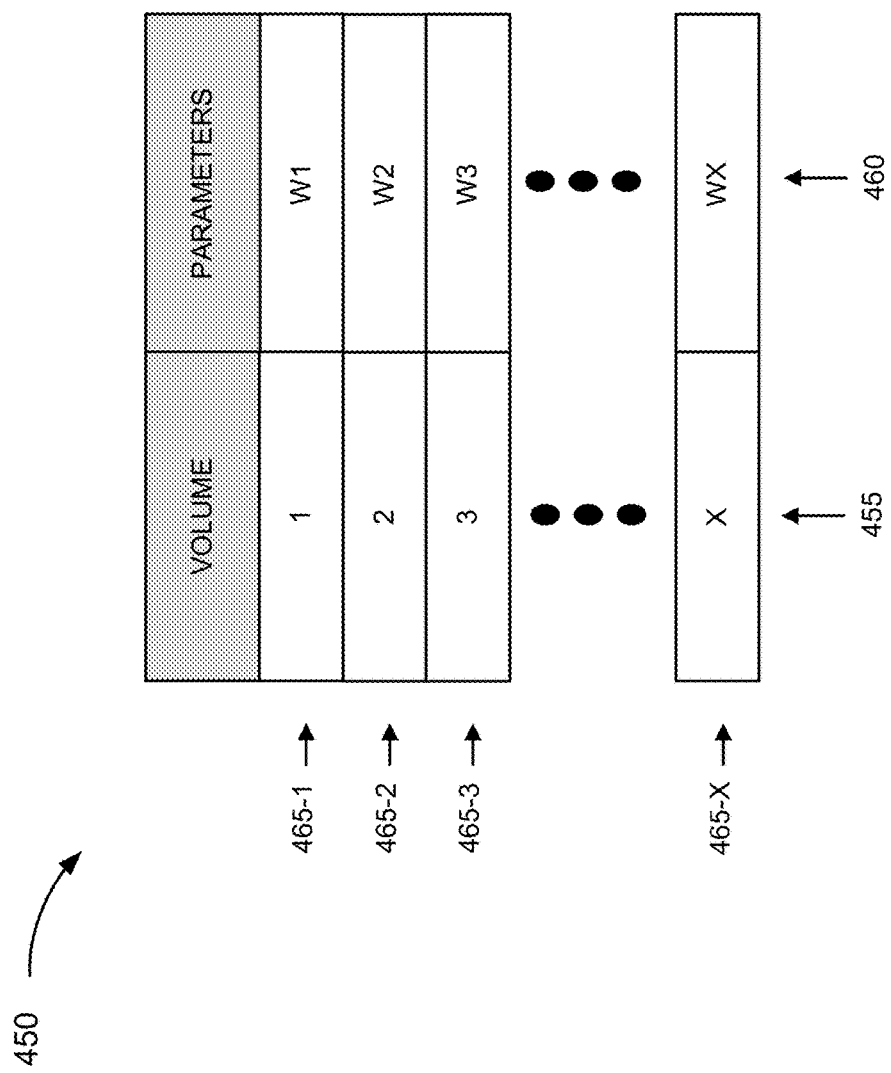
FIG. 4B is a diagram illustrating an exemplary data structure that may be used to store exemplary dynamic high pass filter data.

According to various exemplary embodiments, the 3 dB cutoff may be dynamically adjusted based on logic that calculates the 3 dB cutoff, or wearable device 110 may store data that correlates 3 dB cutoffs with volume settings. For example, FIG. 4B is a diagram illustrating an exemplary data structure that may be used to store exemplary dynamic high pass filter data. For example, the dynamic high pass filter data may be stored in a table 450. Table 450 may include a volume field 455 and a parameters field 460. As further illustrated, table 450 includes records 465-1 through 465-X that each includes a grouping of fields 455 and 460 that may be correlated. The dynamic high pass filter data is illustrated in tabular form merely for the sake of description. The dynamic high pass filter data may be implemented in a data structure different from a table.

Volume field 455 may store data indicating a volume setting of wearable device 110. For example, volume field 455 may store a numerical value (e.g., 1, 2, 3, etc.). Wearable device 110 may include a hard (e.g., a knob, etc.) and/or a soft (e.g., a graphical element of a graphical user interface) volume controller. Parameters field 460 may store data indicating HPF coefficients and/or values. According to an exemplary embodiment, the dynamic high pass filter may use only a portion of the critical bands to apply the 3 dB high pass cutoff. For example, according to an exemplary implementation in reference to the critical bands 500 Hz, 750 Hz, 1 kHz, 1.5 kHz, 2 kHz, 3 kHz, 4 kHz, 6 kHz, and 8 kHz, the dynamic high pass filter may use only low sub-bands (e.g., 500 Hz, 750 Hz, and 1 kHz) for applying dynamic HP filtering.

According to other exemplary implementations, table 450 may store additional, and/or different instances of dynamic high pass filter data in support of the full duplex system, as described herein. For example, table 450 may include another field that stores data pertaining to the received frequency response of speaker 220. This data may be correlated to one or multiple other fields of table 450.

In an embodiment, the dynamic HPF may be implemented as the last audio block in the audio chain and no gain should be adjusted after that for optimum audio performance. Additionally, or alternatively, the dynamic HPF may be implemented as a sixth-order bi-quad filter along with an infinite slope compression.

Figure 5A:
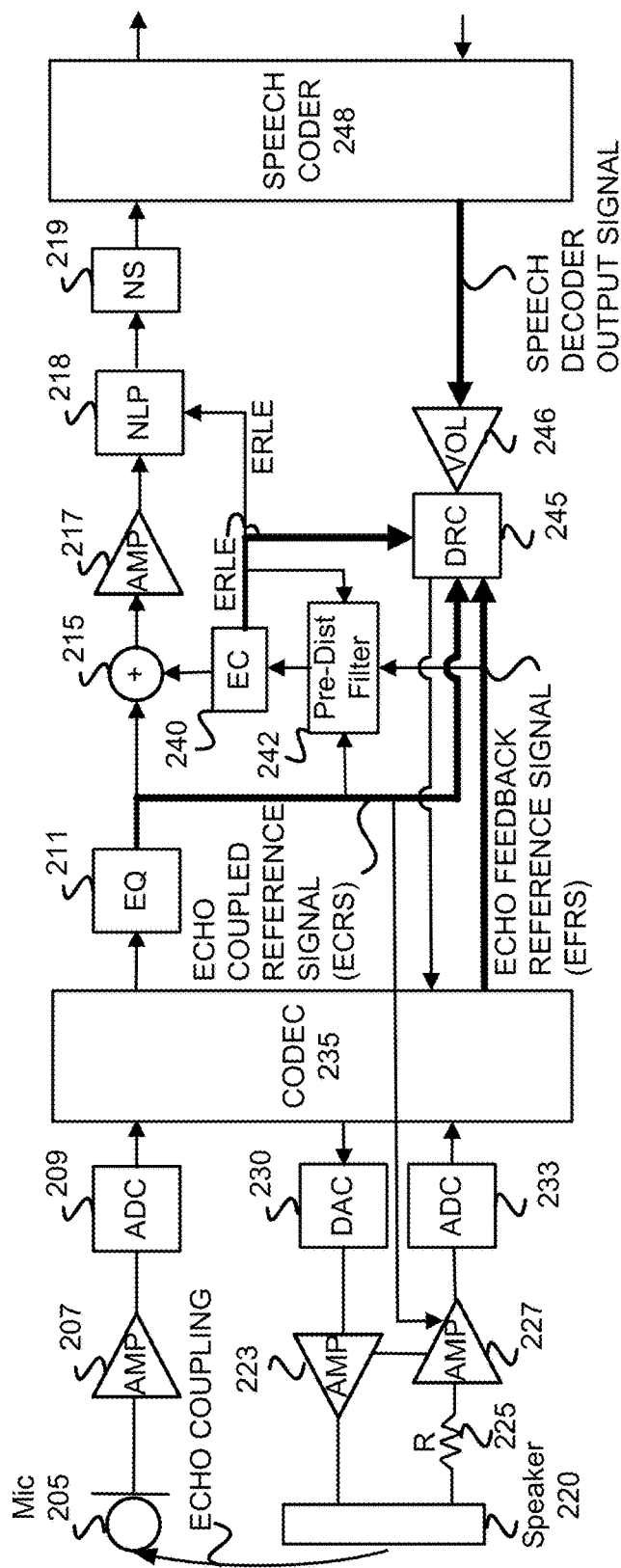
FIGS. 5A-5C are diagrams illustrating exemplary processes of an exemplary embodiment of the full duplex system.

According to an exemplary embodiment, the compressor of DRC 245 may estimate compression based on four input signals. For example, referring to FIG. 5A, as previously described, DRC 245 may receive, as input, an echo coupled reference signal, an echo feedback reference signal, an ERLE signal, and a speech decoder output signal. For example, the echo coupled reference signal may include the distortion caused by the acoustics, such as the echo coupling between speaker 220 and microphone 205. As a result, the input signal at microphone 205 may include, for example, a near-end speech signal from user 105 and a far-end speech signal stemming from the echo coupling and the acoustics of an environment (e.g., reverb, frequency filtering, attenuation, and/or other attributes associated with a room impulse response (RIR)) at which user 105 is located. The echo feedback reference signal may include the downlink signal and distortion introduced by speaker 220. The ERLE signal may be the amount of echo attenuation relative to critical bands, as described herein. The speech decoder output signal may be a clean reference signal that is output from speech coder 248.

Figure 5B:
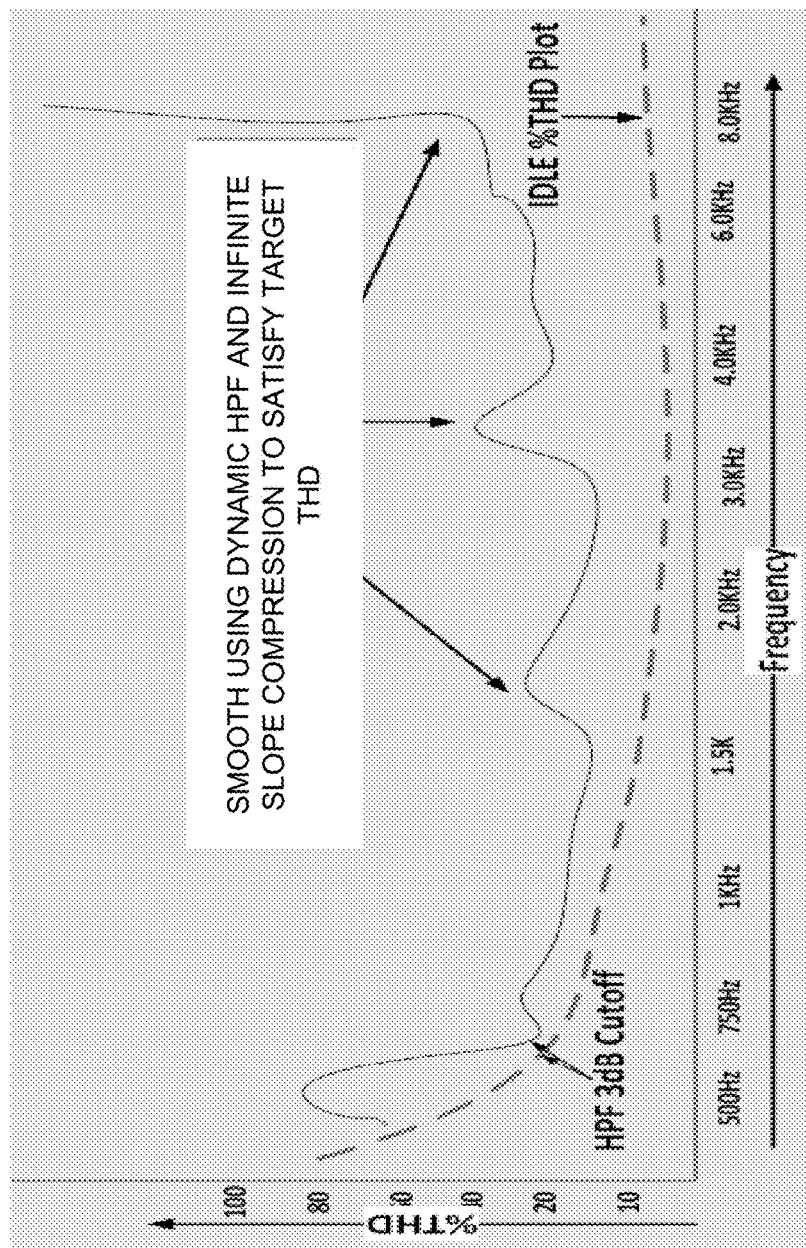
Figure 5C:
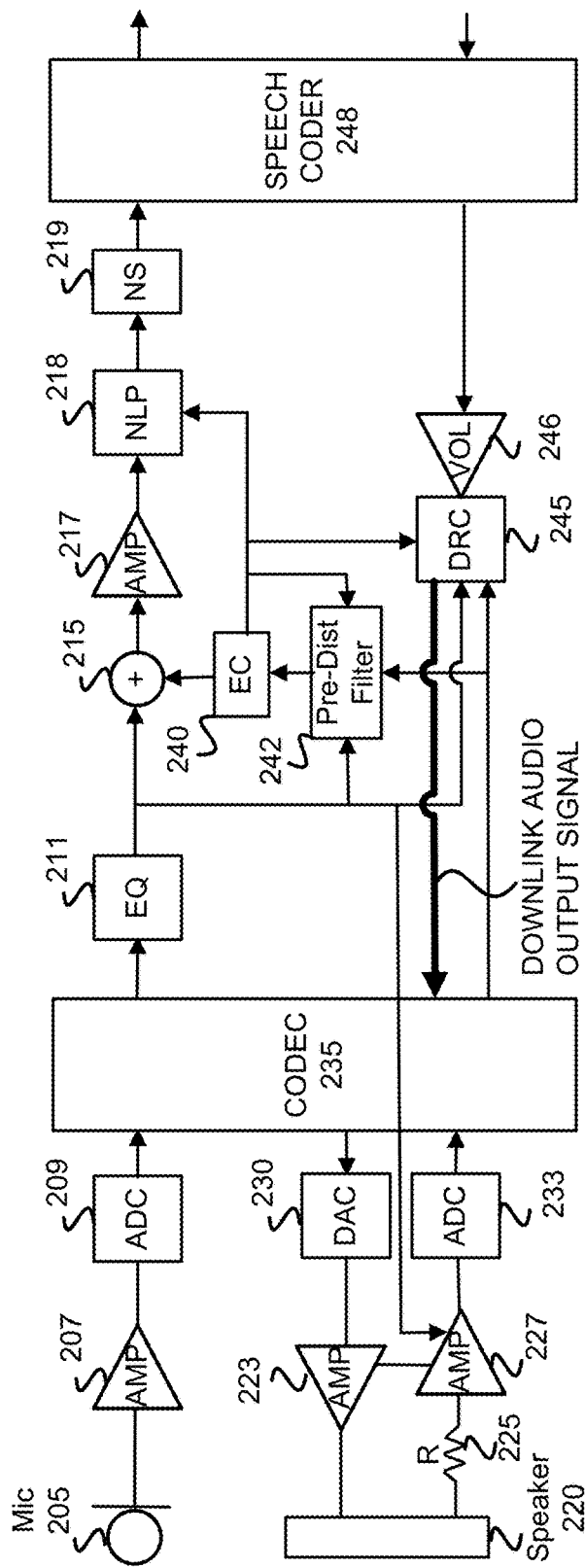

According to an exemplary embodiment, the compressor may be used for optimizing ERLE and downlink voice quality. According to an exemplary implementation in reference to the critical bands 500 Hz, 750 Hz, 1 kHz, 1.5 kHz, 2 kHz, 3 kHz, 4 kHz, 6 kHz, and 8 kHz, the compressor of DRC 245 may perform compression on each critical band based on a target ERLE configured on the uplink direction, and a target received frequency response and a target total harmonic distortion (THD) configured on the downlink direction. For example, referring to FIG. 5B, DRC 245 may apply dynamic HPF coefficients and infinite slope compression that yields a targeted total harmonic distortion. As illustrated, in FIG. 5C, DRC 245 may generate and send a downlink audio output signal to codec 235, which may be subsequently produced by speaker 220.

Wearable device 110 may use the audiogram information of user 105 as a basis to configure parameters of the compressor. For example, the minimum gain on the DRC compression blocks may be applied based on the equal loudness curve for frequencies of the audiogram information, and the desired gain may be applied based on the ERLE, speaker distortion, and the volume setting applied by the user. The compressor may be configured to suppress low frequencies to minimize or prevent distortion and unwanted signals being produced by the small loudspeaker.

Figure 6A:
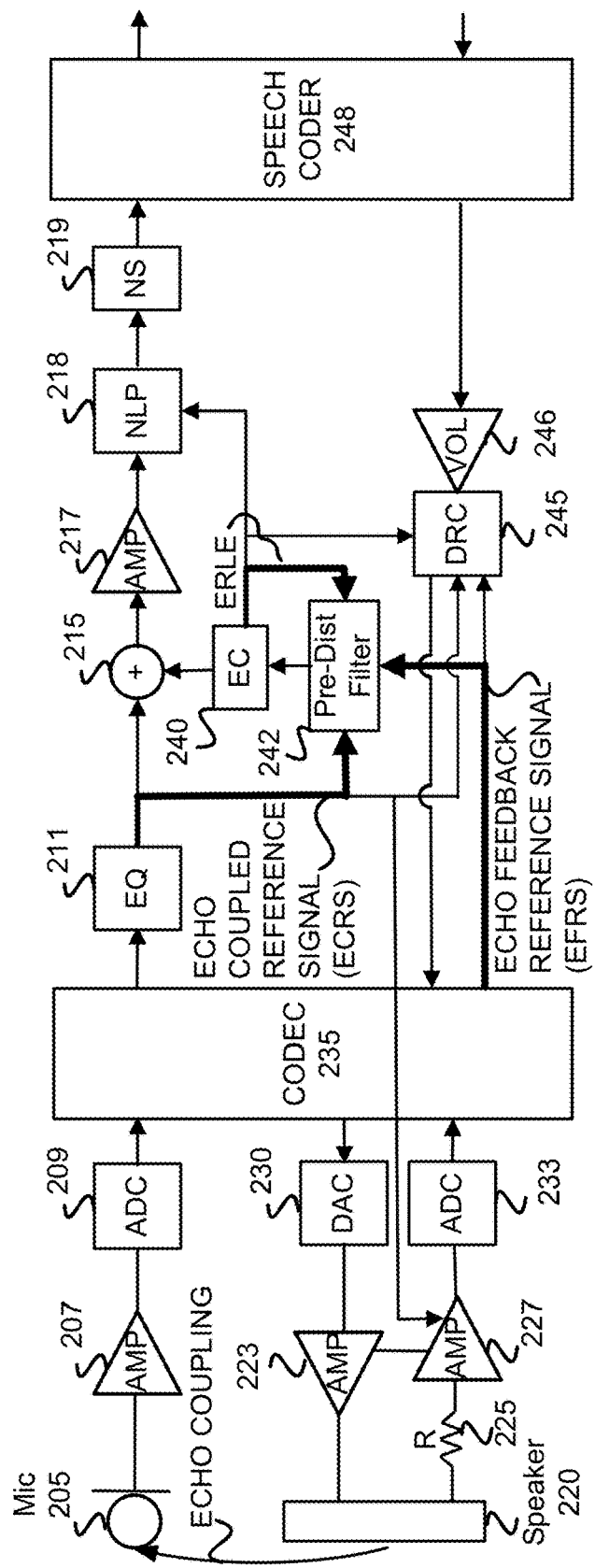
FIGS. 6A-6C are diagrams illustrating exemplary processes of an exemplary embodiment of the full duplex system.
Figure 6B:
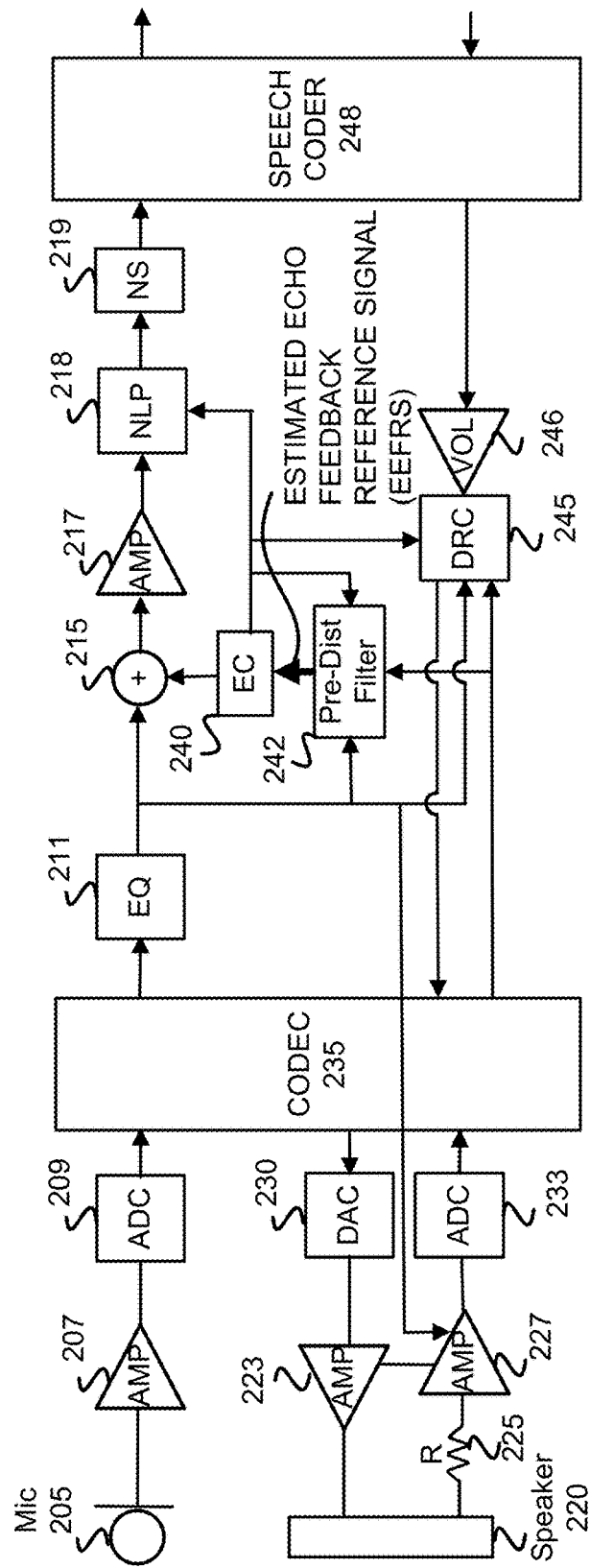

According to an exemplary embodiment, echo canceller 240 uses linear echo cancellation for cancelling both linear and non-linear echo. That is, the linear canceller may provide nonlinear AEC. According to an exemplary embodiment, pre-distortion filter 242 includes logic that generates an estimated echo feedback reference signal, as illustrated in FIG. 6B, based on the echo coupled reference signal, the echo feedback reference signal, and the echo return loss enhancement signal, as illustrated in FIG. 6A. In this regard, pre-distortion filter 242 takes echo path distortion into consideration and may use the echo path distortion as a reference to pre-distort the echo reference feedback reference signal prior to the signal being processed by the echo cancellation algorithm of echo canceller 240. The estimated echo feedback reference signal may allow echo canceller 240 to converge significantly faster and satisfy a targeted ERLE criterion without applying complex filtering (e.g., Volterra filtering) and excessive loss on NLP which reduces the double performance at the far end.

Figure 6C:
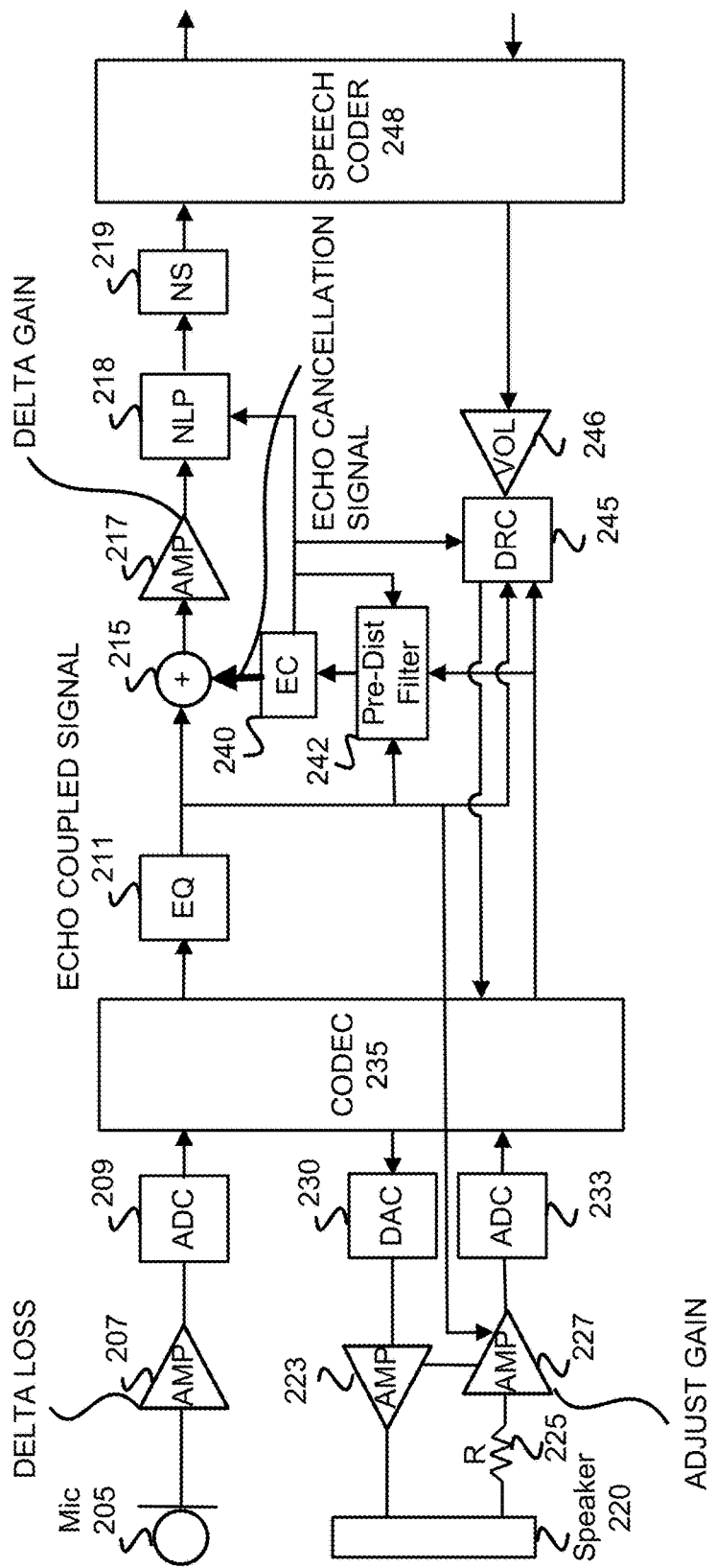

Referring to FIG. 6C, according to an exemplary embodiment, the echo coupled reference signal is used to scale the estimated echo coupled reference signal, as previously described. Pre-distortion filter 242 may scale the echo coupled reference signal and a delta gain (e.g., at amplifier 217) may be applied in the microphone path prior to noise suppressor 219. This may recover the signal loss ratio and may maintain the dynamic range of the full duplex system. The ERLE may be used to scale a pre-distortion filter threshold, and the combination of these scalings may enhance the dynamic range of echo canceller 240 and adaptation speed. For example, if there is steady state coupling and ERLE, then pre-distortion filter 242 may adapt slowly, whereas if echo canceller 240 is providing poor ERLE, then pre-distortion filter 242 may adapt and scale more drastically. For example, an initial gain distribution may be applied for achieving a desired sending loudness rating (SLR)/send frequency response (SFR) in the UL, and the desired receiving loudness rating (RLR)/receive frequency response (RFR) in the DL. The final gain distribution may be applied to re-distribute the UL gain, prevent the echo signal from being saturated in the echo path prior to summer 215, and maintain the desired signal at the input of pre-distortion filter 242. This may be attained via amplifiers 207, 217, and 227. Echo canceller 240 may be trained for a desired acoustics echo and path change scenarios. The training of echo canceller 240 may be done during the duration of the EC convergence time. As a result, a steady state ERLE may be obtained. Pre-distortion filter 242 may be adapted based on the steady state ERLE, the ECRS, and the EFRS. According to an exemplary implementation, pre-distortion filter 242 may not adapt during a double talk and/or a path change scenario. For example, during the path change scenario, there may be a coupling variation that may be handled by echo canceller 240, and so pre-distortion filter 242 may not adapt during this time.

As further illustrated in FIG. 6C, echo canceller 240 may output an echo cancellation signal, which is summed with the echo coupled signal in the uplink/microphone path. Non-linear processing, gain adjustment, and noise suppression may be subsequently applied to the output of summer 215. This enhances the duplex performance in the UL path.

FIG. 7 is a diagram illustrating exemplary components of a device 700 that may be included in wearable device 110, as described herein. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein. Full duplex system 200 illustrated and described may be implemented based on one or more of the exemplary components of device 700.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a nanotechnology-based storage medium.

Memory/storage 715 may be external to and/or removable from device 700, such as, for example, a micro Universal Serial Bus (USB) memory stick, mass storage, off-line storage, or some other type of storing medium (e.g., cloud storage, etc.). Memory/storage 715 may store data, software, and/or instructions related to the operation of device 700.

Software 720 includes an application or a program that provides a function and/or a process. As an example, with reference to wearable device 110, software 720 may include an application that, when executed by processor 710, provides a function of the full duplex system, as described herein. For example, software 720 may include a compression algorithm, a linear filter algorithm, and/or other logic that provides a function of the full duplex system, as described herein. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, etc.).

Input 730 permits an input into device 700. For example, input 730 may include a display, a touchscreen, a touchless screen, a button, a switch, an input port, speech recognition logic, a microphone, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
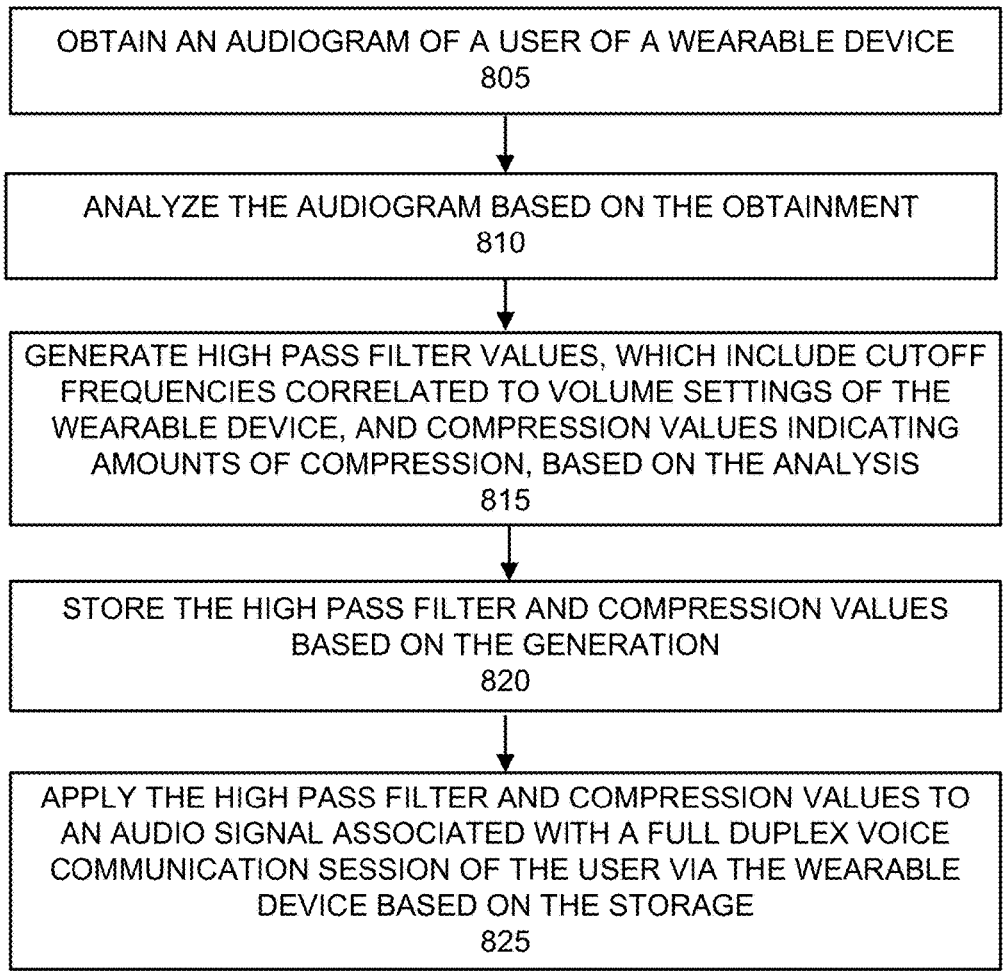
FIGS. 8-12 are flow diagrams illustrating exemplary processes of an exemplary embodiment of the full duplex system.

FIG. 8 is a flow diagram illustrating an exemplary process 800 of an exemplary embodiment of the full duplex system. According to an exemplary embodiment, wearable device 110 performs steps of process 800. For example, processor 710 executes software 720 to perform the steps illustrated in FIG. 8, and described herein.

Referring to FIG. 8, in block 805, audiogram information of a user of a wearable device may be obtained. For example, wearable device 110 may include an application that generates audiogram information. According to another example, wearable device 110 may import the audiogram information from another device. For example, user 105 may access a network device of network 120 via wearable device 110, and the network device may generate the audiogram information. Wearable device 110 may download and store the audiogram information.

In block 810, the audiogram information may be analyzed based on the obtainment. For example, DRC 245 of wearable device 110 may identify loudness and/or threshold hearing values pertaining frequencies, critical bands, and decibel levels, indicative of the hearing ability of user 105.

In block 815, high pass filter values, which include cut-off frequencies correlated to volume settings of the wearable device, and compression values indicating amounts of compression, may be generated based on the analysis. For example, DRC 245 may generate high pass filter coefficients of a high pass filter, which include HPF 3 dB cutoffs, based on the audiogram information, volume settings, THD and RFR plots, and received frequency response of speaker 220. DRC 245 may use the speaker distortion as input via the RFR vs THD plots, the steady state ERLE as a measure of speaker distortion once pre-distortion coefficients are frozen, and the auditory plots for the corresponding frequencies as indication of user auditory system capability. DRC 245 may enhance the DL performance during single talk and double talk scenarios.

In block 820, the high pass filter and compression values may be stored based on the generation. For example, DRC 245 may store the high pass filter and compression values in a memory (e.g., cache or other suitable storage space).

In block 825, the high pass filter and compression values may be applied to an audio signal associated with a full duplex voice communication session of the user via the wearable device based on the storage. For example, during the session, DRC 245 may determine the current volume setting and the RFR, and may apply high pass filtering and compression to the audio signal, as described herein, based on such determinations. As previously described, according to an exemplary embodiment, DRC 245 may perform a look-up for high pass filtering coefficients relative to stored high pass filtering data (e.g., table 450). According to other exemplary embodiments, DRC 245 may calculate (e.g., in real-time or near real-time time) the high pass filtering 3 dB cutoff and transition band slope based on the RFR, distortion, and the volume setting.

Although FIG. 8 illustrates an exemplary process 800 of an echo cancellation service, according to other embodiments, process 800 may include additional operations, fewer operations, and/or different operations than those illustrated in FIG. 8, and described herein.

Figure 9:
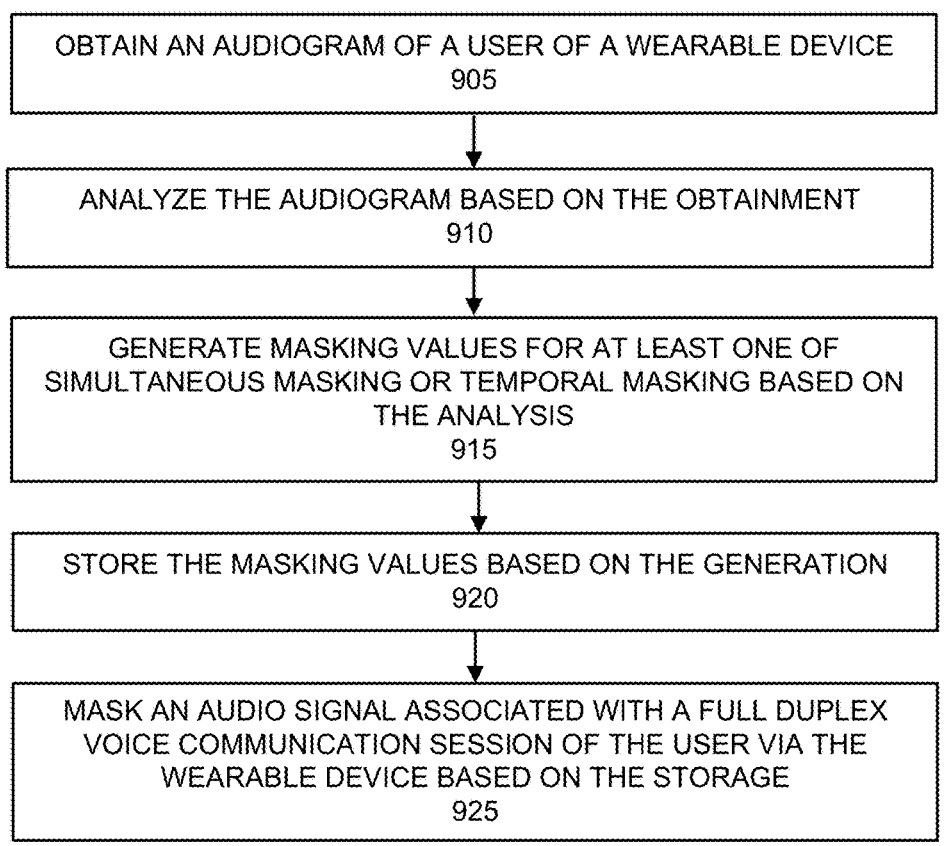

FIG. 9 is a flow diagram illustrating an exemplary process 900 of an exemplary embodiment of the full duplex system. According to an exemplary embodiment, wearable device 110 performs steps of process 900. For example, processor 710 executes software 720 to perform the steps illustrated in FIG. 9, and described herein.

Referring to FIG. 9, in block 905, audiogram information of a user of a wearable device may be obtained. For example, wearable device 110 may include an application that generates audiogram information. According to another example, wearable device 110 may import the audiogram information from another device. For example, user 105 may access a network device of network 120 via wearable device 110, and the network device may generate the audiogram information. Wearable device 110 may download and store the audiogram information.

In block 910, the audiogram information is analyzed based on the obtainment. For example, DRC 245 of wearable device 110 may identify loudness and/or threshold hearing values pertaining frequencies, critical bands, and decibel levels, indicative of the hearing ability of user 105.

In block 915, masking values for at least one of simultaneous masking or temporal masking are generated based on the analysis. For example, depending on the type of masking implemented, DRC 245 may generate a minimum threshold of hearing value, a backward masking value, a forward masking value, and/or a simultaneous masking value based on the audiogram information.

In block 920, the masking values are stored based on the generation. For example, DRC 245 may store the masking values in a memory (e.g., cache or other suitable storage space).

In block 925, an audio signal associated with a full duplex voice communication session of the user via the wearable device is masked based on the storage. For example, during the session, DRC 245 may use the masking values to generate a masking curve for providing simultaneous masking and/or temporal masking to the audio signal.

Although FIG. 9 illustrates an exemplary process 900 of a full duplex system, according to other embodiments, process 900 may include additional operations, fewer operations, and/or different operations than those illustrated in FIG. 9, and described herein.

Figure 10:
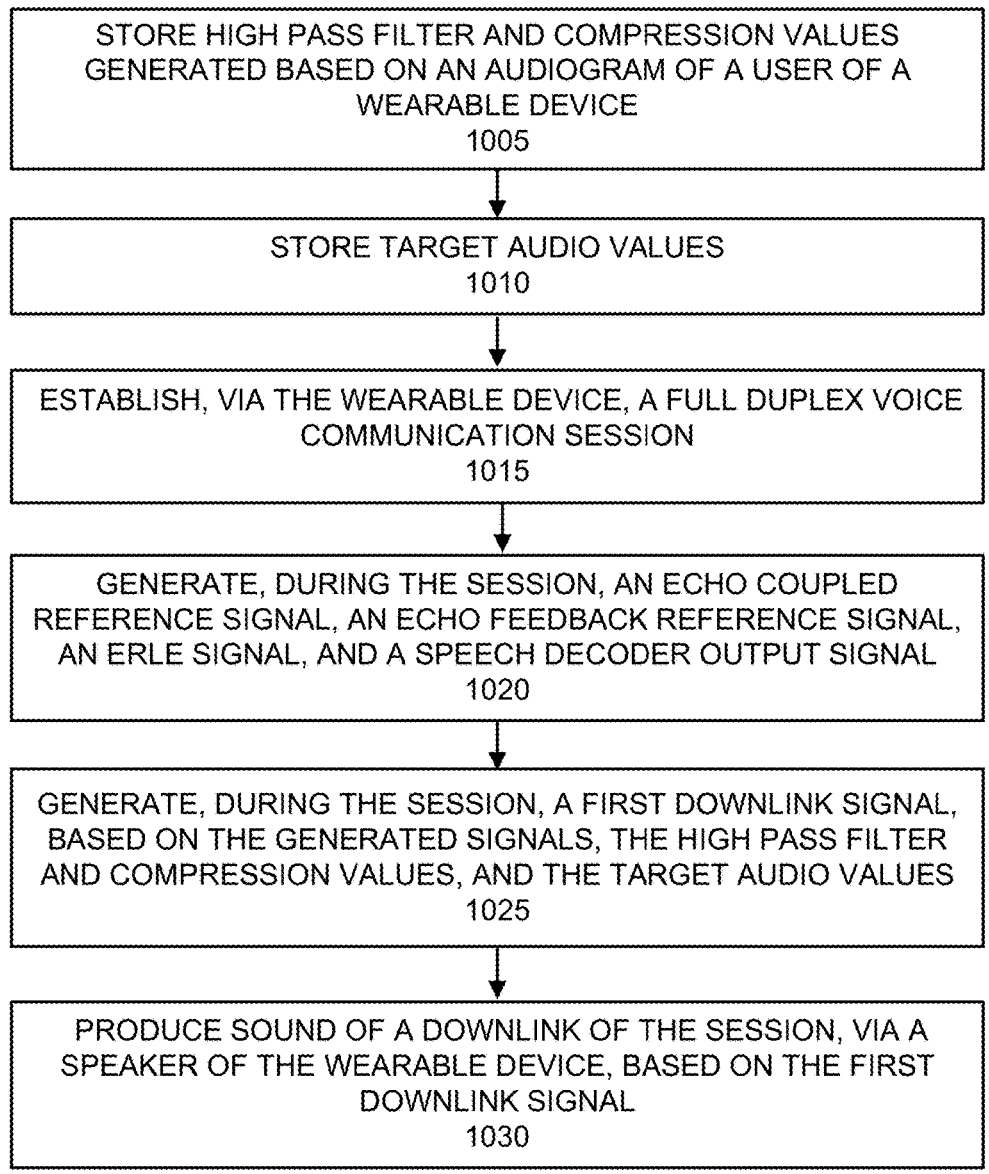

FIG. 10 is a flow diagram illustrating an exemplary process 1000 of an exemplary embodiment of the full duplex system. According to an exemplary embodiment, wearable device 110 performs steps of process 1000. For example, processor 710 executes software 720 to perform the steps illustrated in FIG. 10, and described herein.

Referring to FIG. 10, in block 1005, high pass filter and compression values, which are generated based on the audiogram information of a user and a speaker model of the wearable device, are stored. For example, DRC 245 may generate and store high pass filter and compression values, as previously described in process 800 and elsewhere in this description.

In block 1010, target audio values are stored. For example, DRC 245 may store a target ERLE value, a target THD value (e.g., a percentage of THD versus frequency), and a target RFR.

In block 1015, a full duplex voice communication session is established via the wearable device. For example, user 105 may establish a telephone call with another user and user device, via wearable device 110 and network 120.

In block 1020, an echo coupled reference signal, an echo feedback reference signal, an ERLE signal, and a speech decoder output signal are generated during the session. For example, DRC 245 may continually receive these input signals during the telephone call, as described and illustrated herein. For example, the echo coupled reference signal may be received from the microphone path, the echo feedback reference signal may be received from codec 235, the speech decoder output signal may be received from speech coder 248, and the ERLE signal may be received from echo canceller 240.

In block 1025, a first downlink signal is generated based on the generated signals, the high pass filter and compression values, and the target audio values. For example, DRC 245 may generate a downlink audio output signal based on the echo coupled reference signal, the echo feedback reference signal, the ERLE signal, the speech decoder output signal, the high pass filter and compression values, and the target audio values. According to an exemplary embodiment, the dynamic high pass filter may apply the 3 dB cutoff relative to only a portion of the sub-bands or critical bands (e.g., low bands) of an audio signal, as previously described.

In block 1030, a sound of a downlink of the session, via a speaker of the wearable device, is produced based on the first downlink signal. For example, speaker 220 of wearable device 110 may provide an audio output during the session based on the downlink audio output signal generated by DRC 245. Downlink distortion, double talk, and voice quality associated with the sound may be improved.

Although FIG. 10 illustrates an exemplary process 1000 of a full duplex system, according to other embodiments, process 1000 may include additional operations, fewer operations, and/or different operations than those illustrated in FIG. 10, and described herein.

Figure 11:
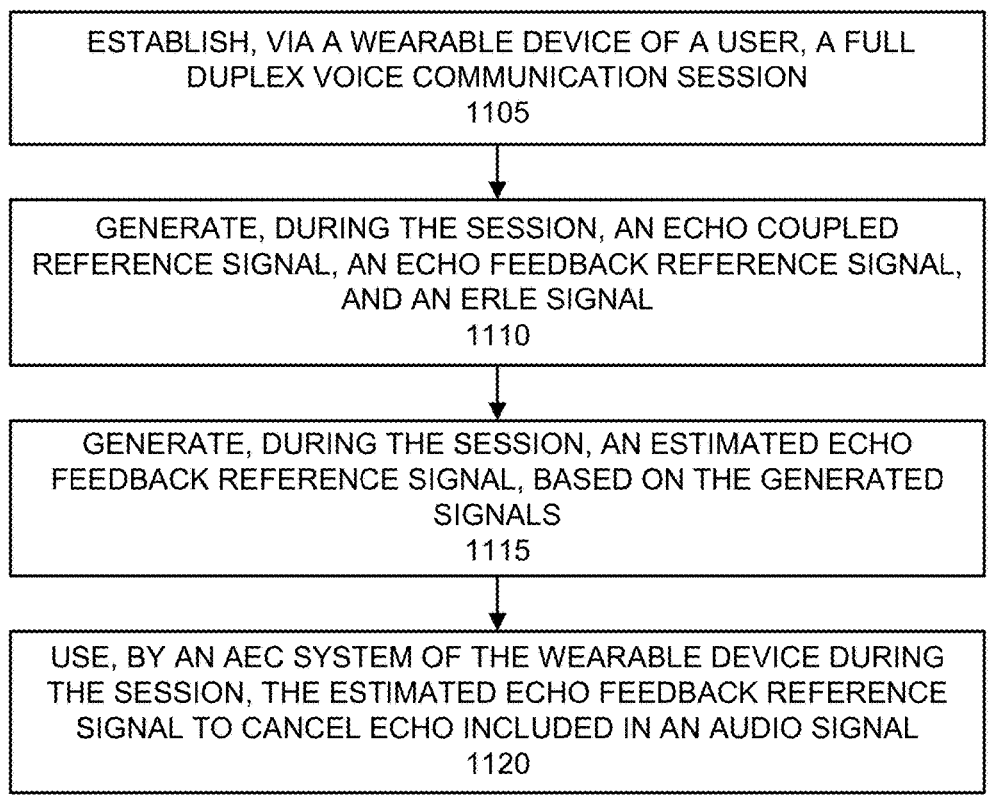

FIG. 11 is a flow diagram illustrating an exemplary process 1100 of an exemplary embodiment of the full duplex system. According to an exemplary embodiment, wearable device 110 performs steps of process 1100. For example, processor 710 executes software 720 to perform the steps illustrated in FIG. 11, and described herein.

Referring to FIG. 11, in block 1105, a full duplex voice communication session is established via a wearable device of a user. For example, user 105 may establish a telephone call with another user and user device, via wearable device 110 and network 120.

In block 1110, an echo coupled reference signal, an echo feedback reference signal, and an ERLE signal is generated during the session. For example, In block 1115, an estimated echo feedback reference signal is generated during the session based on the generated signals. For example, pre-distortion filter 242 may continually receive these input signals during the telephone call, as described and illustrated herein. For example, the echo coupled reference signal may be received from the microphone path, the echo feedback reference signal may be received from codec 235, and the ERLE signal may be received from echo canceller 240. Pre-distortion filter 242 generates the estimated echo feedback reference signal. For example, pre-distortion filter 242 may use the echo coupled reference signal as a reference to pre-distort the echo feedback reference signal. Additionally, for example, pre-distortion filter 242 may use the ERLE signal to scale the pre-distortion filter threshold. Pre-distortion filter 242 outputs the estimated echo feedback reference signal to echo canceller 240. Pre-distortion filter 242 may provide an estimated echo feedback reference signal. The echo coupled reference signal and echo feedback reference signal may be used for estimating echo path distortion. The steady state ERLE signal may be used to scale the pre-distortion filter coefficient. For example, the pre-distortion filter coefficients are not adapted during path changes scenarios and for canceling acoustic echo. The convergence time of the EC, path change detector, and the double talk detector of EC may be used for this purpose.

In block 1120, the estimated echo feedback reference signal is used, by an AEC system of the wearable device, during the session to cancel echo included in an audio signal. For example, echo canceller 240 uses linear echo cancellation for cancelling both linear and non-linear echo based on the estimated echo feedback reference signal. Any residual echo may be reduced by NLP 218.

Although FIG. 11 illustrates an exemplary process 1100 of a full duplex service, according to other embodiments, process 1100 may include additional operations, fewer operations, and/or different operations than those illustrated in FIG. 11, and described herein.

Figure 12:
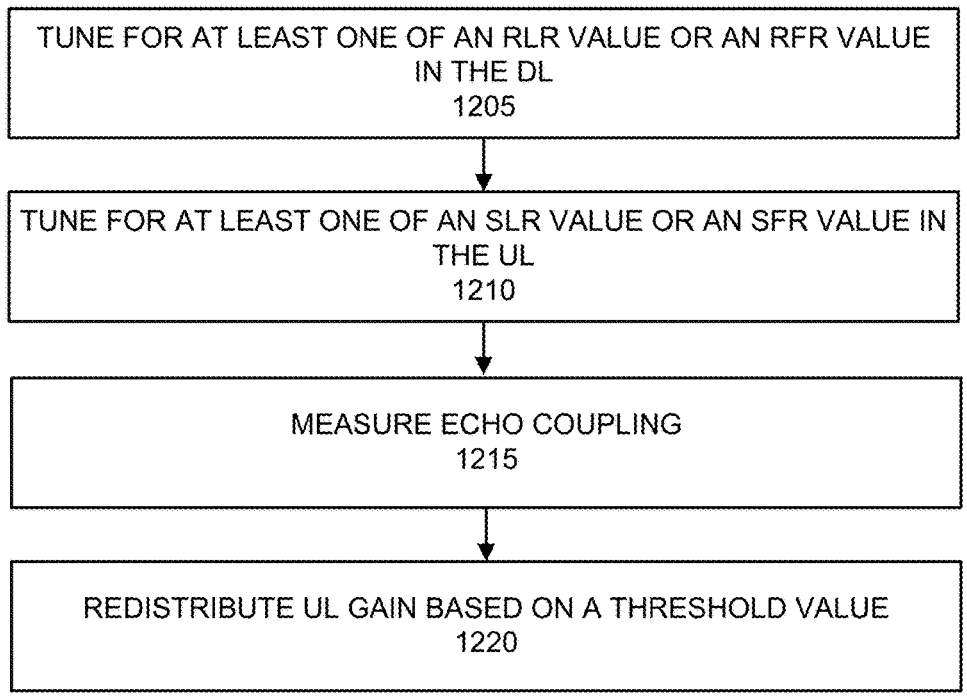

FIG. 12 is a flow diagram illustrating an exemplary process 1200 of an exemplary embodiment of the full duplex system. According to an exemplary embodiment, wearable device 110 performs steps of process 1200. For example, processor 710 executes software 720 to perform the steps illustrated in FIG. 12, and described herein.

Referring to FIG. 12, in block 1205, at least one of an RLR value or an RFR value may be tuned to in the DL. For example, DRC 245 may tune to a threshold RLR value and/or a threshold RFR value.

In block 1210, in block 1210, at least one of an SLR value or an SFR value may be tuned to in the UL. For example, amplifier 207 and equalizer 211 may tune to a threshold SLR value and/or a threshold SFR value.

In block 1215, echo coupling may be measured. For example, pre-distortion filter 242 may measure echo coupling based on the ECRS.

In block 1220, an UL gain may be redistributed based on a threshold value. For example, amplifiers 207 and 217 in the UL path may redistribute an UL gain based on the measured echo coupling. By way of further example, amplifier 207 may reduce an uplink gain to ensure a minimum margin of gain relative to a peak value to account for the echo coupling. According to an exemplary implementation, the minimum margin may be approximately 9 dB or some other configurable value. Also, amplifier 217 may increase an uplink gain by a configurable margin of gain to account for the reduction of gain via amplifier 207. The configurable margin of gain may be based on the configurable reduction of gain associated with amplifier 207. Amplifier 227 may adjust a gain of the EFRS, which is sent to pre-distortion filter 242, in view of the gain of the ECRS that is also sent to pre-distortion filter 242 via equalizer 211.

Although FIG. 12 illustrates an exemplary process 1200 of a full duplex service, according to other embodiments, process 1200 may include additional operations, fewer operations, and/or different operations than those illustrated in FIG. 12, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 8-12, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   storing, by a device, high pass filter values and compression values;
   storing, by the device, target audio values including a target echo return loss enhancement value and a target total harmonic distortion value;
   establishing, by the device, a full duplex voice communication session with another device;
   generating, by the device during the full duplex voice communication session, an echo coupled reference signal, an echo feedback reference signal, an echo return loss enhancement signal, and a first downlink signal;
   generating, by the device during the full duplex voice communication session, a second downlink signal based on the echo coupled reference signal, the echo feedback reference signal, the echo return loss enhancement signal, the first downlink signal, the high pass filter and compression values, and the target audio values;
   producing, by a speaker of the device during the full duplex voice communication session, sound based on the second downlink signal;
   reducing, by the device, a first gain of a first echo coupled signal in an uplink path based on a first threshold value, wherein the first threshold value is based on a gain attributed to echo coupling; and
   increasing, by the device, a second gain of a second echo coupled signal in the uplink path based on the first threshold value.

2. The method of claim 1, wherein the echo coupled reference signal includes distortion caused by acoustics, the echo feedback reference signal includes a downlink signal, which includes distortion of the speaker, of a speaker path of the device, and the echo return loss enhancement signal indicates an amount of echo attenuation relative to critical frequency bands.

3. The method of claim 2, further comprising:
   generating, by the device, an estimated echo coupled reference signal based on the echo coupled reference signal, the echo feedback reference signal, and the echo return loss enhancement signal; and
   applying, by an echo canceller of the device, linear cancellation to an uplink audio signal in the uplink path based on the estimated echo coupled reference signal.

4. The method of claim 3, wherein the generating of the estimated echo coupled reference signal comprises:
   using, by the device, the echo coupled reference signal as a reference to pre-distort the echo feedback reference signal.

5. The method of claim 2, wherein the generating of the estimated echo coupled reference signal comprises:
   using, by the device, the echo return loss enhancement signal to adapt coefficients of a pre-distortion filter.

6. The method of claim 1, wherein the device is a wearable device.

7. The method of claim 1, further comprising:
obtaining, by the device, audiogram information of a user of the device, wherein the audiogram information indicates a hearing ability of the user;
generating, by the device based on the audiogram information, the high pass filter values, which include cutoff frequencies that are correlated to volume settings of the device, and the compression values indicating amounts of compression;
generating, by the device based on the audiogram information, masking values for at least one of simultaneous masking or temporal masking; and
storing, by the device, the masking values, and wherein the generating of the second downlink signal further comprises generating the second downlink signal based on the masking values.

8. The method of claim 7, wherein the generating of the second downlink signal further comprises:
identifying, by the device, a current volume setting from the volume settings; and
selecting, by the device in response to the identifying, one of the high pass filter values and one of the compression values.

9. A device comprising:
a microphone;
a speaker;
a communication interface;
a memory, wherein the memory stores instructions; and
a processor, wherein the processor executes the instructions to:
store high pass filter values and compression values;
store target audio values including a target echo return loss enhancement value and a target total harmonic distortion value;
establish, via the communication interface, a full duplex voice communication session with another device;
generate, during the full duplex voice communication session, an echo coupled reference signal, an echo feedback reference signal, an echo return loss enhancement signal, and a first downlink signal;
generate, during the full duplex voice communication session, a second downlink signal based on the echo coupled reference signal, the echo feedback reference signal, the echo return loss enhancement signal, the first downlink signal, the high pass filter and compression values, and the target audio values;
produce, by the speaker during the full duplex voice communication session, sound based on the second downlink signal;
reduce a first gain of a first echo coupled signal in an uplink path based on a first threshold value, wherein the first threshold value is based on a gain attributed to echo coupling; and
increase a second gain of a second echo coupled signal in the uplink path based on the first threshold value.

10. The device of claim 9, wherein the echo coupled reference signal includes distortion caused by acoustics, the echo feedback reference signal includes a downlink signal, which includes distortion of the speaker, of a speaker path of the device, and the echo return loss enhancement signal indicates an amount of echo attenuation relative to critical frequency bands.

11. The device of claim 10, wherein the processor further executes the instructions to:
generate an estimated echo coupled reference signal based on the echo coupled reference signal, the echo feedback reference signal, and the echo return loss enhancement signal; and
apply, by an echo canceller of the device, linear cancellation to an uplink audio signal in the uplink path based on the estimated echo coupled reference signal.

12. The device of claim 11, wherein, when generating the estimated echo coupled reference signal, the processor further executes the instructions to:
use the echo coupled reference signal as a reference to pre-distort the echo feedback reference signal; and
use the echo return loss enhancement signal to adapt coefficients of a pre-distortion filter.

13. The device of claim 9, wherein the device is a wearable device.

14. The device of claim 9, wherein the processor further executes the instructions to:
obtain audiogram information of a user of the device, wherein the audiogram information indicates a hearing ability of the user;
generate, based on the audiogram information, the high pass filter values, which include cutoff frequencies that are correlated to volume settings of the device, and the compression values indicating amounts of compression;
generate, based on the audiogram information, masking values for at least one of simultaneous masking or temporal masking; and
store the masking values, and wherein, when generating the second downlink signal, the processor further executes the instructions to:
generate the second downlink signal based on the masking values.

15. The device of claim 14, wherein, when generating the second downlink signal, the processor further executes the instructions to:
identify a current volume setting from the volume settings; and
select, in response to the identification, one of the high pass filter values and one of the compression values.

16. A non-transitory, computer-readable storage medium storing instructions executable by a processor of a device, wherein the instructions comprise instructions to:
store high pass filter values and compression values;
store target audio values including a target echo return loss enhancement value and a target total harmonic distortion value;
establish a full duplex voice communication session with another device;
generate, during the full duplex voice communication session, an echo coupled reference signal, an echo feedback reference signal, an echo return loss enhancement signal, and a first downlink signal;
generate, during the full duplex voice communication session, a second downlink signal based on the echo coupled reference signal, the echo feedback reference signal, the echo return loss enhancement signal, the first downlink signal, the high pass filter and compression values, and the target audio values;
produce, by a speaker of the device during the full duplex voice communication session, sound based on the second downlink signal;
reduce a first gain of a first echo coupled signal in an uplink path based on a first threshold value, wherein the first threshold value is based on a gain attributed to echo coupling; and increase a second gain of a second echo coupled signal in the uplink path based on the first threshold value.

17. The non-transitory, computer-readable storage medium of claim 16, wherein the echo coupled reference signal includes distortion caused by acoustics, the echo feedback reference signal includes a downlink signal, which includes distortion of the speaker, of a speaker path of the device, and the echo return loss enhancement signal indicates an amount of echo attenuation relative to critical frequency bands.

18. The non-transitory, computer-readable storage medium of claim 17, wherein the instructions further comprise instructions to:
generate an estimated echo coupled reference signal based on the echo coupled reference signal, the echo feedback reference signal, and the echo return loss enhancement signal; and
apply, by an echo canceller of the device, linear cancellation to an uplink audio signal in the uplink path based on the estimated echo coupled reference signal.

19. The non-transitory, computer-readable storage medium of claim 17, wherein the instructions to obtain further comprise instructions to:
use the echo coupled reference signal as a reference to pre-distort the echo feedback reference signal; and
use the echo return loss enhancement signal to adapt coefficients of a pre-distortion filter.

20. The non-transitory, computer-readable storage medium of claim 16, wherein the instructions to obtain further comprise instructions to:
obtain audiogram information of a user of the device, wherein the audiogram information indicates a hearing ability of the user;
generate, based on the audiogram information, the high pass filter values, which include cutoff frequencies that are correlated to volume settings of the device, and the compression values indicating amounts of compression;
generate, based on the audiogram information, masking values for at least one of simultaneous masking or temporal masking; and
store, by the device, the masking values, and wherein, when generating the second downlink signal, the processor further executes the instructions to:
generate the second downlink signal based on the masking values.

* * * * *